United States Patent [19]

Wilkinson

[11] 3,997,449

[45] Dec. 14, 1976

[54] LOW VISCOSITY FLAME RETARDANT

[75] Inventor: Theodore C. Wilkinson, Ann Arbor, Mich.

[73] Assignee: Michigan Chemical Corporation, Chicago, Ill.

[22] Filed: Sept. 29, 1975

[21] Appl. No.: 617,794

[52] U.S. Cl. .............................. 252/8.1; 260/2.5 AJ
[51] Int. Cl.$^2$ ....................... C09K 3/28; C08J 9/16
[58] Field of Search .................. 252/8.1; 260/2.5 AJ

[56] References Cited

UNITED STATES PATENTS

| | | | |
|---|---|---|---|
| 3,677,942 | 8/1972 | Feiner et al. | 252/8.1 |
| 3,729,434 | 4/1972 | Todd | 252/8.1 X |
| 3,826,762 | 7/1974 | Treadwell | 252/8.1 X |
| 3,856,535 | 12/1974 | Ferguson | 252/8.1 |

FOREIGN PATENTS OR APPLICATIONS

| | | | |
|---|---|---|---|
| 889,720 | 2/1962 | United Kingdom | 260/2.5 AJ |

*Primary Examiner*—Leland A. Sebastian
*Attorney, Agent, or Firm*—Robert M. Phipps

[57] ABSTRACT

Disclosed is a low viscosity flame retardant comprising a mixture of 2,3-dibromopropanol and tris(2,3-dibromopropyl)phosphates. The low viscosity flame retardants of this invention have special utility in both rigid and flexible polyurethane polymers.

10 Claims, No Drawings

LOW VISCOSITY FLAME RETARDANT

BACKGROUND OF THE INVENTION

1. Field of the Invention

This invention relates to novel mixtures of tris(2,3-dibromopropyl)phosphate and 2,3-dibromopropanol.

2. Description of the Prior Art

The use of tris(2,3-dibromopropyl)phosphate by itself is well known in the art of flame retarding polyurethane polymers. It is also well known in the art to flame retard polyurethane polymers with 2,3-dibromopropanol. Further, it is known to mix tris(2,3-dibromopropyl)phosphate with some other substance, for example, polyol, to reduce the viscosity of the tris(2,3-dibromopropyl)phosphate. However, such prior art mixtures of tris(2,3-dibromopropyl)phosphate significantly reduce the flame retardant efficacy of the flame retardant additive. It has been discovered that by mixing tris(2,3-dibromopropyl)phosphate with 2,3-dibromopropanol the viscosity of tris(2,3-dibromopropyl)phosphate is reduced so that the mixture is more readily and easily handled but without reducing the flame retardant efficacy of the flame retardant additives.

SUMMARY OF THE INVENTION

In accordance with this invention there is provided a low viscosity flame retardant comprising from about 5 percent to about 40 percent 2,3-dibromopropanol and from about 60 percent to about 95 percent tris (2,3-dibrompropyl)phosphate, all percentages being weight percent of the total mixture.

DESCRIPTION OF THE PREFERRED EMBODIMENTS

The low viscosity flame retardant within the scope of this invention comprises from about 5 percent to about 40 percent, preferably about 10 percent to about 25 percent, and more preferably about 15 percent of 2,3-dibromopropanol and from about 60 percent to about 95 percent, preferably from about 75 percent to about 90 percent, and more preferably about 85 percent tris(2,3-dibromopropyl)phosphate.

Since the object of this invention is to provide a low viscosity flame retardant having substantial flame retardant efficacy while possessing a viscosity readily capable of being handled by conventional processing equipment, the invention can also very well be described in terms of the desired viscosity of the 2,3-dibromopropanol and tris(2,3-dibromopropyl)phosphate mixture. In terms of viscosity, the low viscosity flame retardant of this invention comprises a mixture of 2,3-dibromopropanol and tris(2,3-dibromopropyl)phosphate having a viscosity of from about 1,000 to 6,000 cps, preferably from about 1,500 to about 3,000 cps, and more preferably from about 1,500 to about 2,400 cps at a temperature of from about 20° to about 30° C.

The low viscosity flame retardant of this invention is useful in many polymeric compositions. This invention finds particular utility in flexible and rigid polyurethane polymers where the viscosity of the reactants and the reactant mixtures are critical to machine preparation of the desired polymer. Therefore, also within the scope of this invention are polymeric compositions comprising a polyurethane polymer, said polymer including both rigid and flexible polyurethane foams as well as elastomer polymers, and a flame retarding amount of a low viscosity flame retardant comprising from about 5 percent to about 40 percent, preferably from about 10 percent to about 25 percent, and more preferably about 15 percent of 2,3-dibromopropanol and from about 60 percent to about 95 percent, preferably from about 75 percent to about 90 percent and more preferably about 85 percent tris(2,3-dibromopropyl)phosphate.

The polymeric composition can also be described in terms of the desired processing viscosity of the low viscosity flame retardant within the scope of this invention. In terms of the viscosity the polymeric composition within the scope of this invention would comprise a polyurethane polymer and a flame retarding amount of low viscosity flame retardant comprising a mixture of 2,3-dibromopropyl and tris(2,3-dibromopropyl)phosphate having a viscosity of from about 1,000 to about 6,000 cps, preferably from about 1,500 to about 3,000 cps, and more preferably from about 1,500 to about 2,400 cps.

The flame retardant mixture of this invention may be incorporated into or applied onto virtually any inflammable natural or synthetic polymeric or elastomeric material by techniques which are standard or known to those in the art.

In particular, polyurethane polymers, including both rigid and flexible polyurethane foams as well as elastomer polymers, are prepared by the general step of reacting an isocyanate with a polyol and/or polyester, for example, an isocyanate such as toluene-2,4-diisocyanate, toluene-2,6-diisocyanate, polymethylene polyphenylisocyanate, 3,3'-dimethyl-4,4'-biphenylene diisocyanate, etc. Polyols include glycerin polypropoxylated ether triol, ethlene oxide modified polyproxylated glycerine ether triols, polypropylglycol, sucrose polypropoxylated ether polyol, etc. Polyesters containing two hydroxyl end groups prepared from dibasic acids such as adipic, maleic, or phthalic acid and diols such as 1,2-propanediol, butane diol, hexane diol, etc. Catalysts, such as stannous octoate, dibutyl tin diluarate, triethanol amine, N-ethylmorpholine, triethylene diamine, are usually required to effect the isocyanate reaction with the polyol. Foams are prepared by including a blowing agent which is volatized by the exothermic polyol/isocyanate reaction or by reacting water with an excess of the isocyanate thereby generating carbon dioxide. Surfactants such as alkoxylated dimethyl silicones are generally used if a polyurethane foam is desired. A low viscosity flame retardant can be added as required, said flame retardant usually being added to the polyol prior to reacting the polyol with the isocyanate, but alternatively capable of being added simultaneously with all other polyurethane polymer ingredients.

For a detailed description of various polyurethane preparations of specific elastomers and specific rigid and flexible foams, one is directed to the literature and patents wherein may be found numerous such detailed descriptions, e.g., K. C. Frisch and J. H. Saunders, "Plastic Foams", Vol. 1, parts 1 and 2, Marcel Dekker, Inc., New York, 1972 and T. H. Ferrigno, "Rigid Plastics Foams", Second Edition, Reinhold Publishing Corp., New York, 1967.

The following examples are provided for the purpose of further illustration only and are not intended to be limitations on the disclosed invention. Unless otherwise specified, all temperatures are expressed in degrees centigrade; all weights are expressed in grams; and all volumes are expressed in milliliters.

EXAMPLE 1

An 80/20 mixture of toluene 2,4- and 2,6-diisocyanate, Type I, (hereinafter referred to as TDI) was placed in the first tank of a Martin Sweets Modern Module No. 3A urethane foam equipment modified for simultaneous addition of up to six components. A mixture of 15 parts 2,3-dibromopropanol and 85 parts tris(2,3-dibromopropyl)phosphate (0.5 kg) was mixed with 10 kg of polyol (Voranol 4291, Dow Chemical Corporation, Midland, Michigan). Stannous octoate catalyst was placed in a third tank (T-11, M & T Chemicals, Inc., New York, N.Y., is a stannous octoate plus mineral oil mixture). Into a fourth tank was placed a silicone surfactant (L-540, Union Carbide Corporation, New York, N.Y.). Water/triethylene diamine (Dabco 33LV)/N-ethyl morpholine (hereinafter referred to as NEM) mixture was added to a fifth tank. (Dabco 33LV, Houndry Process and Chemical Company, is a 33% solution of triethylene diamine and dipropylene glycol). All of the above components were pumped at a predetermined rate simultaneously into a chamber and were mixed using a size 3 pin type mixer revolving at 3,000 rpm in the following ratio:

| Component | Parts by Weight |
|---|---|
| Low Viscosity Flame Retardant Mixture<br>15% 2,3-dibromopropanol<br>85% tris(2,3-dibromopropyl)-phosphate | 5 |
| Polyol | 100 |
| Silicone surfactant | 1.0 to 1.5 |
| NEM | 0.10 |
| Triethylene diamine | 0.40 to 0.42 |
| Stannous octoate catalyst | 0.10 to 0.18 |
| Water | 3.0 |
| TDI | 103 to 105 index |

The mixture was dropped during the mixing procedure into a 14 × 14 × 6 inch Adstrom cardboard box. After the foam came to full height it was post cured in a forced air oven at 210° to 220° F. for 30 minutes.

After allowing the foam to sit for at least 7 days, the foam was then subject to the several tests listed in Tables I and II, infra.

The same procedure was used to make other foams at different load levels. These foams were also subjected to the various same tests as the above foam and the data obtained is also reported in Tables I and II, infra.

TABLE I

Physical Properties of Molded Urethane Foam Containing Low Viscosity Flame Retardant

| Flame Retardant Load Level[a] | Control | 2.5 php[b] | 5.0 php |
|---|---|---|---|
| Density, pcf[c,e] | 2.40 | 2.44 | 2.64 |
| Air Flow, SCFM[d,e] | 1.22 | 1.27 | 1.42 |
|  | 1.35 | 1.61 | 1.61 |
| Tensile, psi[e] | 18.3 | 23.3 | 25.4 |
| Aged[f] | 26.7 | 27.5 | 31.4 |
| Elongation, %[e] | 134 | 162 | 175 |
| Aged[f] | 191 | 193 | 198 |
| Tear, pli[e,h] | 1.89 | 2.73 | 2.30 |
| Ball Rebound, % | 33 | 25 | 28 |
| ILD, p/50 sq. in.[e,i] |  |  |  |
| 25% | 46.2 | 39.7 | 41 |
| 65% | 111.5 | 102 | 106 |
| 25% R[g] | 36.4 | 32.0 | 34 |
| Compression Set, $C_d$, %[e] |  |  |  |
| 50% | 8.18 | 5.93 | 7.0 |
| 50% aged[f] | 18.1 | 9.56 | 10.4 |
| 90% | 6.00 | 3.63 | 5.5 |

TABLE I-continued

Physical Properties of Molded Urethane Foam Containing Low Viscosity Flame Retardant

| Flame Retardant Load Level[a] | Control | 2.5 php[b] | 5.0 php |
|---|---|---|---|
| 90% aged[f] | 21.0 | 16.6 | 22.7 |

[a]Flame retardant comprised of 15% 2,3-dibromopropanol, 85% tris(2,3-dibromopropyl)-phosphate mixture.
[b]php means parts per hundred polyol.
[c]pcf means pounds per cubic foot.
[d]SCFM means standard cubic feet per minute.
[e]Dry heat aged, as per ASTM D-2406
[f]Autoclave aged as per ASTM D-2406.
[g]R means return
[h]pli means pounds per linear inch
[i]ILD means indentation load deflection

TABLE II

Combustibility of Molded Urethane Foams Containing Low Viscosity Flame Retardant

| Flame Retardant Load Level[a] | Control | 2.5 php | 5.0 php |
|---|---|---|---|
| Oxygen Index[b] | 19.5 | 23.0 | 23.5 |
| MVSS302, in/min[c] |  |  |  |
| Initial | pass, 3.05 (10)[d] | pass, 0 (0) | pass, 0 (0) |
| Aged[e] | pass, 2.92 (10) | pass, 0 (0) | pass, 0 (0) |
| Aged[f] | pass, 3.19 (10) | pass, 0 (0) | pass, 0 (0) |
| Vertical Burn Test[g] |  |  |  |
| Maximum, Char, in. |  |  |  |
| Initial | complete burn | N.D.[h] | 4.7 |
| Aged 2 weeks at 150° F. | complete burn | N.D. | 5.8 |
| at 250° F. | complete burn | N.D. | 4.5 |
| Average Char, in. |  |  |  |
| Initial | complete burn | N.D. | 4.4 |
| Aged 2 weeks at 150° F. | complete burn | N.D. | 5.3 |
| at 250° F. | complete burn | N.D. | 3.2 |
| Afterburn, sec. | not applicable | N.D. | none |
| Rating | fail | N.D. | pass |

[a]Flame retardant comprised of 15% 2,3-dibromopropanol, 85% tris(2,3-dibromopropyl)phosphate mixture.
[b]ASTM D-3863-74.
[c]MVSS302 is the Motor Vehicle Safety Standard 302, Department of Transportation.
[d]Numbers in bracket give distance in inches.
[e]Aged as per FBMS TM 10-12, General Motor Corporation.
[f]Aged as per ESBM25P3-A, Ford Motor Corporation.
[g]State of California, Bureau of Home Furnishing, Department of Consumer Affairs, Standard 117.
[h]N.D. means not determined.

Tables I and II clearly show that a low viscosity flame retardant within the scope of this invention can effectively flame retard molded urethane foam without detrimentally affecting said foam's physical properties and, it should be noted, in many instances actually improving the physical properties of said foam.

EXAMPLE 2

A foam was prepared using the following basic formulation:

| Component | Parts by Weight |
|---|---|
| Polyol[a] | 100 |
| Silicone Glycol[b] Surfacant | 2 |

-continued

| Component | Parts by Weight |
|---|---|
| Trichlorofluoromethane[c] | 35 |
| Polyisocyanate[d] | 135 |

[a]alkanolamine polyol, molecular weight approximately 3500, hydroxyl number approximately 530, Thanol R-350-X, Jefferson Chemical Co., Houston, Texas.
[b]Dow Corning 193, Dow Corning Corp., Midland, MI.
[c]Freon 11B, E. I. DuPont de Nemours & Co., Wilmington, Del.
[d]Polymeric aromatic isocyanate, 31.5% available NCO, Mondur MRS, Mobay Chemical Co., Pittsburgh, PA.

The polyol, surfactant, and fluorocarbon blowing agent were combined in a masterbatch based on 1000 g of polyol to minimize loss of blowing agent.

The following procedure was used to prepare the foam:

1. The polyisocyanate was weighed into a tared, 10-ounce, paper cup (allowances being made for hold-up) and the cup set aside while the remaining ingredients were weighed out and mixed.
2. The polyol masterbatch was weighed out, in the proper amount to give 100 grams of polyol, in a 1-quart, untreated, paper cup.
3. The 10 grams of a low viscosity flame retardant comprising a 15% 2,3-dibromopropanol, 85% tris(2,3-dibromopropyl)phosphate mixture were then weighed into the same 1-quart cup.
4. The contents of the one quart cut were mixed at 1000 rpm for 5 seconds.
5. The polisocyanate was then added and stirring at 1000 rpm continued for 10 seconds.
6. The mix was poured into a 5 pound, untreated, paper tub and allowed to rise.

After the foam was tack-free, and substantially cured, it was set aside for at least 7 days prior to subjecting said foam to an Oxygen Index Test, ASTM D-2863-7A. The results of said test are reported in Table III, infra.

The same procedure was used to make other foams at different load levels. These foams were also subjected to the same Oxygen Index Test as the above foam and the data are also reported in Table III, infra.

TABLE III

| Flame Retardant Load Level, php | OI |
|---|---|
| 0 | 18.5 |
| 10 | 24.0 |
| 20 | 25.0 |
| 30 | 26.5 |

EXAMPLE 3

The viscosity of a low-viscosity flame retardant mixture comprising 15%, 2,3-dibromopropanol and 85% tris(2,3-dibromopropyl)phosphate was determined at various temperatures using a rotating spindle Brookfield viscometer. Data obtained from said tests are reported in Table IV.

TABLE IV

| Temperature, ° C. | Viscosity, cps[a] |
|---|---|
| 16 | 5,800 |
| 18 | 5,000 |
| 20 | 4,000 |
| 22 | 3,400 |
| 24 | 2,700 |
| 26 | 2,400 |
| 28 | 2,000 |
| 30 | 1,700 |

TABLE IV-continued

| Temperature, ° C. | Viscosity, cps[a] |
|---|---|
| 32 | 1,500 |

[a]cps means centipoise

EXAMPLE 4

The viscosities of several low-viscosity flame retardant mixtures comprising different proportions of 2,3-dibromopropanol and tris(2,3-dibromopropyl)phosphate were determined at 23° C. using a rotating spindle Brookfield viscometer. Data obtained from said tests are reported in Table V.

TABLE V

| 2,3-dibromopropanol, % | Tris(2,3-dibromopropyl)phosphate, % | Viscosity, cps at 23° C. |
|---|---|---|
| 5 | 95 | 6,400 |
| 10 | 90 | 3,624 |
| 25 | 75 | 990 |
| 40 | 60 | 354 |
| 0 | 100 | 11,740 |
| 100 | 0 | 37 |

Table V above also reports the viscosity of the 2,3-dibromopropanol and the tris(2,3-dibromopropyl)-phosphate moieties of the flame retardant mixtures prepared therefrom.

The viscosity of tris(2,3-dibromopropyl)phosphate is about 10,000 to about 13,000 cps at ambient temperatures of from about 70° to about 90° F. This high viscosity possessed by tris(2,3-dibromopropyl)phosphate presents a problem for the introduction and even distribution of the flame retardant into the polyurethane foam. Unless the tris(2,3-dibromopropyl)phosphate is introduced into the polyurethane polymer by careful monitoring via the use of time consuming techniques, the tris(2,3-dibromopropyl)phosphate will tend to impart uneven flame retardancy as well as uneven physical properties to the polymer. As a result of this it is evident that the use of tris(2,3-dibromopropyl)phosphate by itself is an undesirable flame retardant additive for polyurethanes. The prior art process of diluting the tris(2,3-dibromopropyl)phosphate with one of the reactants, for example, polyol, is also very undesirable because it is a time consuming step which further necessitates extra mixing equipment and changing the tris(2,3-dibromopropyl)phosphate-polyurethane reactant mixture depending on the particular formulation or foam type desired, i.e., depending on what reactants were being employed to formulate the polyurethane. A third prior art technique of diluting tris(2,3-dibromopropyl)phosphate with a non-reactive flame retardant diluent, such as triethyl phosphate, is unsatisfactory because said non-reactive diluents do not react with the polyurethane structure and therefore volatize out of the polymer structure. As a consequence of this volatization, the polyurethane is not durably flame retarded. In contrast to this, the tris(2,3-dibromopropyl)phosphate-2,3-dibromopropanol mixtures within the scope of this invention impart durable flame retardant characteristics to polyurethanes treated therewith because of the reactive nature of the 2,3-dibromopropanol moiety.

Based on this disclosure, many other modifications and ramifications will naturally suggest themselves to those skilled in the art. These are intended to be comprehended as within the scope of this invention.

The embodiments of the invention in which an exclusive property or privilege is claimed are defined as follows:

1. A low viscosity flame retardant comprising from about 5 percent to about 40 percent 2,3-dibromopropanol and from about 60 percent to about 95 percent tris(2,3-dibromopropyl)phosphate.

2. The flame retardant of claim 1 comprising from about 10 percent to about 25 percent 2,3-dibromopropanol and from about 75 percent to about 90 percent tris(2,3-dibromopropyl)phosphate.

3. The flame retardant of claim 2 comprising about 15 percent 2,3-dibromopropanol and about 85 percent tris(2,3-dibromopropyl)phosphate.

4. The flame retardant of claim 1 comprising a mixture of 2,3-dibromopropanol and tris(2,3-dibromopropyl)phosphate having a viscosity of from about 1,000 to about 6,000 cps at a temperature from about 20° to about 30° C.

5. The flame retardant of claim 4 having a viscosity of from about 1,500 to 3,000 cps.

6. A polymeric composition comprising a polyurethane polymer and a flame retarding amount of a low viscosity flame retardant of claim 1.

7. The polymeric composition of claim 6 wherein the flame retardant comprises from about 10 percent to about 25 percent 2,3-dibromopropanol and from about 75 percent to about 90 percent tris(2,3-dibromopropyl)phosphate.

8. The polymeric composition of claim 7 wherein the flame retardant comprises about 15 percent 2,3-dibromopropanol and about 85 percent tris(2,3-dibromopropyl)phosphate.

9. The polymeric composition of claim 6 wherein the flame retardant comprises a mixture of 2,3-dibromopropanol and tris(2,3-dibromopropyl)phosphate having a viscosity of from about 1,000 to about 6,000 cps at a temperature from about 20° to about 30° C.

10. The polymeric composition of claim 9 wherein the flame retardant has a viscosity of from about 1,500 to 3,000 cps.

* * * * *

UNITED STATES PATENT OFFICE
CERTIFICATE OF CORRECTION

PATENT NO. : 3,997,449
DATED : December 14, 1976
INVENTOR(S) : Theodore C. Wilkinson It is certified that error appears in the above-identified patent and that said Letters Patent are hereby corrected as shown below:

Insert on the data (cover) page as part of item 56 the following item:

OTHER REFERENCES

Benbow et al., COMBUSTION AND FLAME, THE JOURNAL OF THE COMBUSTION INSTITUTE, Vol. 24, No. 2, pages 217-230, April 1975.

Signed and Sealed this

Twenty-ninth Day of March 1977

[SEAL]

Attest:

RUTH C. MASON
Attesting Officer

C. MARSHALL DANN
Commissioner of Patents and Trademarks